J. BEAUMONT & F. G. WHITE.
ELECTRIC BLOCK SIGNAL APPARATUS.
APPLICATION FILED MAR. 21, 1912.
1,093,596.
Patented Apr. 21, 1914.
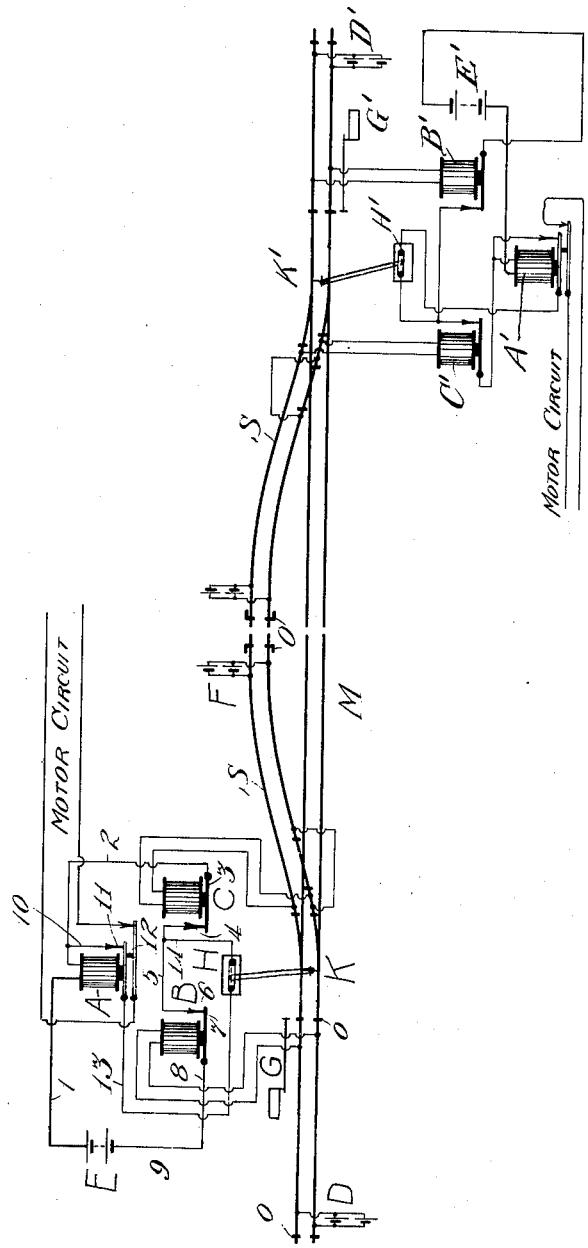
Witnesses
Inventors
Joseph Beaumont
Frederick G. White
By Offield Towle Graves & Offield
Attorneys.

UNITED STATES PATENT OFFICE.

JOSEPH BEAUMONT AND FREDERICK G. WHITE, OF CHICAGO, ILLINOIS.

ELECTRIC BLOCK-SIGNAL APPARATUS.

1,093,596. Specification of Letters Patent. Patented Apr. 21, 1914.

Application filed March 21, 1912. Serial No. 685,392.

*To all whom it may concern:*

Be it known that we, JOSEPH BEAUMONT and FREDERICK G. WHITE, citizens of the United States, residing at Chicago, in the county of Cook and State of Illinois, have invented certain new and useful Improvements in Electric Block-Signal Apparatus, of which the following is a specification.

Our invention relates to block signals for railways, and more particularly to the control of signals governing the movements of engines and trains to and from side tracks, and it has for its salient objects, first, to make the signal display a stop indication and maintain such indication, when a train or engine is passing from the main track to a side track or passing track and until such train or engine has cleared the main track and is clear of main track movement of cars or engines. Second, to make the signal display a clear indication when a train is moving from the passing track or side track to the main track, when main track is unoccupied ahead of the signal. Third, to make the signal display a stop indication when a train on the passing track or side track is fouling main track movements of cars or engines, when the track switch is set for said main track movements. Fourth, to provide improvements generally in the control of such signals.

The invention hereinafter set forth will be described as applicable to a gravity-operating semaphore signal system controlled by a closed circuit and operated by an electric motor. In such systems, when the controlling devices hold the motor circuit closed, the signal will be raised to and held at a position indicating that the main track is clear, while the breaking of the motor circuit will permit the signal to drop by gravity to indicate that there is an obstruction to through train movements on the main track. This obstruction may be either the opening of the switch leading to the side track, or the standing of a car or engine on the side track at a position in which it would be struck by a passing train on the main track.

As our invention is not concerned with the construction of the signal or with the particular arrangement by which the motor raises the signal to "safety" it will be sufficient for the present purposes to describe the manner of controlling the open and closed condition of the motor circuit.

In the accompanying drawing M represents a section of main track and S represents a section of side track, both being represented as broken out at the center for the purpose of bringing the whole within the compass of a single sheet of drawings. The switches leading to the side track are represented by K and K', and the signals at the ends of the side track by G and G'. As the apparatus is alike at both ends of the side track it will be sufficient to describe that at the left of the drawing.

Both the main track and the side track serve as electrical conductors, but the lengths of such conductors are limited by insulated rail joints shown at O and other similarly marked points on the drawing. Batteries D and F furnish current to sections of the track as shown, while battery E furnishes current to a holding relay A. The relay A closes the circuit for the motor which operates the signal G and also closes a holding circuit for itself under conditions which will be hereinafter described.

The relay B is bridged on one section of the main track and is normally kept in an attracted position by current received from battery D. In a similar manner the relay C is bridged on one section of the side track and is normally kept in attracted position by current received from battery F. The side track switch K is of any suitable mechanical construction but is mechanically connected to an electrical switch H in such a manner that the electrical connection through H is open when the switch K is set for main track movement of trains, but is closed when the switch K is set for train movements to and from the side track.

The operation is as follows: Assume that the main track is clear and that the signal G is set for "proceed" position. When a train or engine comes upon the section of main track between D and K, a shunt or short circuit will be established between the rails of the track by way of the wheels and axles of the engine or train with the result that current will be cut off from the relay B. This breaks the circuit for A at the point 6, 7, in the circuit: E, 1, A, 2, 3, 4, 5, 6, 7, 8, 9, E. Breaking the circuit through A permits its armature to fall back breaking the motor circuit and consequently permitting the signal G to drop to "danger," or "stop." Assuming that the switch K is set for movement of the train from the main track to the side track, then, when the train enters upon the side track between K and F, the relay C will be short circuited and its armature 3 will drop back breaking the circuit for A at the second point 3, 4. When the train has passed off of the section of main track between D and K, the relay B will again receive current from battery D and will close the circuit for A at 6, 7. This circuit, however, will remain open at 3, 4, until the train has passed the insulated joints O beyond the battery F. These insulated joints are located far enough up the side track so that when the train is past them it will be clear of any train passing on the main track. When the train has thus passed the section of side track served by battery F, the relay C will again receive current and will close the remaining open point in the circuit for relay A. The actuation of the relay A will in turn close the circuit for the motor and cause the signal G to be set to indicate a clear main track. Assuming, now, that a train is to pass from the side track to the main track by moving toward the left, and that the switch K is set for such movement, then the electrical connection through H will be closed. When the engine enters upon the section of track served by the battery F, current will be cut off through the relay C and the circuit for A will be broken at 3, 4. The closing of the electrical switch H, however, furnishes a closed branch for A as follows: A, 10, 11, 12, 13, H, 14, 5, etc., hence, the breaking of the circuit at 3, 4, does not, in this case, result in breaking the motor circuit. When the train emerging from the side track enters upon that section of the main track served by the battery D, the relay B will be released and the relay A be deënergized, thus breaking the motor circuit and permitting the signal G to drop to "stop" position. When the rear end of the train passes from the section of side track served by the battery F the relay C will be energized to close the connection, but current will not reach the relay A until the end of the train has passed beyond the section of main track served by the battery D so that relay B may close the contacts 6, 7. When this occurs the motor will set the signal G to show clear main track.

It will be observed from the foregoing description that cutting off the current from the relay B always results in releasing the relay A and causing the signal G to be set for danger, but that the accomplishment of this result by cutting off the current from the relay C depends upon the previous condition of the electrical switch H. If the switch K is set for movements between main and side tracks, then the switch H is closed, and the release of the armature of relay C will not, of itself, break the circuit for the motor-controlling relay A. Also, that when the signal G stands at danger, supplying current to relay B will not cause the signal to be changed until the relay C is also actuated. The reason is that in this case the switch H does not, of itself, furnish a completely closed branch because that branch includes the contacts 11, 12, which must be closed by the relay A before the branch can become effective. Defining the same thing by train movements, it will be seen that when a train moves from main to side track the signal is set at danger before the train actually enters the side track, and that said signal will not be set to show a clear main track until the rear of the train has reached a position on the side track where it will not be fouled by a train passing on the main track. Also that, if the main track between D and K is clear, a train passing from the side track to the main track does not set the signal to danger until the train actually enters upon the main track, and that when the signal is so set it will remain at danger until the train has passed along the track far enough to clear the section served by the battery D. If, however, a train on the side track should start to move to the main track before the switch K is set for such movement, the signal G will be immediately set to danger by the train entering upon the section of side track served by the battery F.

In railroad operation there is a general rule on single track roads which forbids a train to pass a danger signal. In prior block signaling systems this general rule could not be enforced and had to be overlooked particularly where the switch was set for movement from the side track to the main track and the train would have to enter the main track past a danger signal. In our system this rule can be rigidly enforced, as the train can always enter the main track with a clear signal. As soon as the train enters the main track, the main track relay is deënergized and the signal is set to danger.

It must be borne in mind that what is shown on the application drawing is not all the signaling equipment associated with the track. The signaling apparatus and circuits shown are additional to the main block signaling system and control particularly the movement between the sidings and main tracks. In addition to what is shown on the drawing there would of course be switch stands and main semaphore signals. Suppose there is a train on track section M and another on siding S and both trains are traveling toward the switch K. In the drawing the switch K is shown in position to connect the siding and main track, and as controlled by our improved system, the semaphore G remains at clear indication and the train on the siding will proceed to the main track. However, the semaphore of the main block signaling system with which our system is associated will be thrown to "stop"

indication by the train on the track section M, this being the arrangement in nearly all block signaling systems. Furthermore, the target of the switch stand set by the brakeman of the side track train will be at "stop" indication and the switchman himself will prevent procedure of the train on track M to the switch. Thus a side track train moving toward the main track has its movements fully protected against a train on the main track section M by the main block signaling system semaphore, by the switch stand target, and by the switchman.

Applicants' circuit is of value particularly when trains meet and one movement heads into the siding while the other occupies the main track. In prior systems as generally installed, the semaphore G would clear up immediately after the train had passed the insulated joints at the switch or after the switch had been set for the main track with the train still fouling the main line. Under such conditions the train on the main track having entered the block on a clear signal to execute the "meet order" would probably (and has been known to) start out and side-swipe the train entering the siding. With applicants' circuit the signal G will indicate proceed only when the movement to the siding is in the clear, that is, when the train is fully on the siding and off of the fouling section. This system will under all conditions indicate "stop" when it is dangerous to proceed; and when trains are headed toward a switch on both main track and siding the main track switch stand will select between the two movements and the man operating the switch for the siding movement will provide additional protection should necessity arise.

We claim as our invention:

1. In a block signaling system, the combination of an insulated main track section and an insulated side track section and a switch for connecting same, a signal adjacent said switch and at the outside thereof, a motor for operating said signal, a relay controlling the motor circuit, a second relay connected with the opposite rails of the track section just outside said switch and a source of current connected with said rails, a third relay connected with the opposite rails of the side track section adjacent the switch and a source of current connected with said side track rails, a circuit for the first relay mutually controlled by the second and third relays when the track switch is open, said circuit being closed when both said track sections are clear and said circuit being open when either of said track sections is occupied by a train, and means controlled by said track switch for destroying the control of said first relay circuit by said side track section.

2. In a block signaling system, the combination of an insulated main track section and an insulated side track section and a switch for connecting same, a signal adjacent said switch and at the outside thereof, a motor for operating said signal, a relay controlling the motor circuit, a second relay connected with the opposite rails of the track section just outside said switch and a source of current connected with said rails, a third relay connected with the opposite rails of the side track section adjacent the switch and a source of current connected with said side track rails, a circuit for the first relay mutually controlled by the second and third relays when the track switch is open, said circuit being closed when both said track sections are clear and said circuit being open when either of said track sections is occupied by a train; and a shunt circuit controlled upon closure of the track switch for preventing opening of the first relay circuit when a train enters said side track section connected with the third relay.

3. In a block signaling system, the combination of an insulated main track section and an insulated side track section and a switch for connecting same, a signal at said switch, a motor controlling the actuation of said signal, a relay controlling the motor circuit, a second relay connected with the rails of said main track section and a source of current connected with said rails to cause energization of said second relay when said track section is unoccupied, a third relay connected with the rails of said side track section adjacent said switch and a source of current connected with said rails whereby said third relay is energized when said side track section is unoccupied, an energizing circuit for said first relay and contacts controlled by said second and third relays respectively to normally close said circuit whereby the deënergization of either the second or the third relay will effect opening of said first relay circuit, and a circuit in shunt with the third relay contacts controlled by said track switch to be opened when said switch is in position to disconnect the side track section from the main track and to be closed when said switch is moved to connect said track sections whereby said signal will be uninfluenced by the condition of said side track section.

4. In a block signaling system, the combination of an insulated main track section and an insulated side track section and a switch for connecting same, a signal at said switch, a motor controlling the actuation of said signal, a relay controlling the motor circuit, a second relay connected with the rails of said main track section and a source of current connected with said rails to cause energization of said second relay when said track section is unoccupied, a third relay connected with the rails of said side track section and a source of current connected with said rails whereby said third relay is energized when said side track section is unoccupied, an energizing circuit for said first relay and contacts controlled by said second and third relays respectively to normally close said circuit whereby deënergization of either the second or the third relay will effect opening of said first relay circuit, and a circuit in shunt with the third relay contacts controlled by said switch to be opened when the switch disconnects the side track section from the main track section and to be closed when the switch connects the side track section to the main track section to shift full control of the first relay circuit to the second relay.

5. In electric signaling, the combination of a main track and a side track and a track switch for connecting and disconnecting same, a section of the main track just outside of the switch being insulated and the section of the side track just inside of the switch being insulated, a signal outside the switch, electromagnetic mechanism for controlling said signal and circuit connections from said mechanism to both said insulated track sections whereby entrance of a train on either insulated section will cause setting of the signal to danger indication when said sections are disconnected by the track switch, and means controlled by the setting of the switch to connect the track sections for preventing control of the signal by the side track section whereby said signal will remain at clear indication upon entrance of a train on the side track section and until the train enters the main track section.

JOSEPH BEAUMONT.
FREDERICK G. WHITE.

Witnesses:
   Albert H. Graves,
   Emilie Rose.